United States Patent
Kasai et al.

(10) Patent No.: US 11,108,055 B2
(45) Date of Patent: Aug. 31, 2021

(54) FUEL CELL

(71) Applicant: Panasonic Intellectual Property Management Co., Ltd., Osaka (JP)

(72) Inventors: Yoko Kasai, Osaka (JP); Yoshifumi Taguchi, Osaka (JP); Tsutomu Kawashima, Nara (JP); Tsutomu Fujii, Osaka (JP); Shinichiro Imura, Hyogo (JP); Toshihiro Otsuka, Kyoto (JP); Miyuki Yoshimoto, Osaka (JP); Kozue Kuniyoshi, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 100 days.

(21) Appl. No.: 16/209,022

(22) Filed: Dec. 4, 2018

(65) Prior Publication Data

US 2019/0115602 A1  Apr. 18, 2019

Related U.S. Application Data

(63) Continuation of application No. PCT/JP2017/021082, filed on Jun. 7, 2017.

(30) Foreign Application Priority Data

Jun. 20, 2016  (JP) .............................. JP2016-121374

(51) Int. Cl.
*H01M 8/0247* (2016.01)
*H01M 8/0273* (2016.01)
(Continued)

(52) U.S. Cl.
CPC ....... *H01M 8/0247* (2013.01); *H01M 8/0273* (2013.01); *H01M 8/0282* (2013.01);
(Continued)

(58) Field of Classification Search
CPC .. H01M 8/0247; H01M 8/0273; H01M 8/242; H01M 8/0282; H01M 8/0284; H01M 2008/1095
See application file for complete search history.

(56) References Cited

U.S. PATENT DOCUMENTS

2005/0142430 A1* 6/2005 Yoshida .............. H01M 4/8605
                                                    429/481
2008/0113243 A1   5/2008 Kawashima et al.
(Continued)

FOREIGN PATENT DOCUMENTS

EP  2 830 131   1/2015
JP  8-045517    2/1996
(Continued)

OTHER PUBLICATIONS

International Search Report of PCT application No. PCT/JP2017/021082 dated Aug. 1, 2017.
(Continued)

*Primary Examiner* — Philip A. Stuckey
(74) *Attorney, Agent, or Firm* — Wenderoth, Lind & Ponack, L.L.P.

(57) ABSTRACT

A fuel cell includes: an electrolyte membrane; a cathode positioned on a first surface of the electrolyte membrane; an anode positioned on a second surface of the electrolyte membrane; a cathode-side sealant positioned on a surface of the cathode different from the electrolyte membrane side of the cathode; an anode-side sealant positioned on a surface of the anode different from the electrolyte membrane side of the anode; a cathode-side separator positioned on a surface of the cathode-side sealant different from the cathode side of the cathode-side sealant; and an anode-side separator positioned on a surface of the anode-side sealant different from the anode side of the anode-side sealant. The anode-side separator has a projection on a surface stacked on the anode-side sealant, or the cathode-side separator has a projection on a surface stacked on the cathode-side sealant.

5 Claims, 8 Drawing Sheets

(51) Int. Cl.
*H01M 8/242* (2016.01)
*H01M 8/0282* (2016.01)
*H01M 8/0284* (2016.01)
*H01M 8/1018* (2016.01)

(52) U.S. Cl.
CPC ......... *H01M 8/0284* (2013.01); *H01M 8/242* (2013.01); *H01M 2008/1095* (2013.01)

(56) References Cited

U.S. PATENT DOCUMENTS

2017/0229718 A1    8/2017   Taguchi et al.
2018/0114993 A1*   4/2018   Jeong ................. H01M 8/0284

FOREIGN PATENT DOCUMENTS

| | | |
|---|---|---|
| JP | 2005-339954 | 12/2005 |
| JP | 2008-123957 | 5/2008 |
| WO | 2006/075681 | 7/2006 |
| WO | 2016/031226 | 3/2016 |

OTHER PUBLICATIONS

Extended European Search Report dated May 20, 2019 in European Patent Application No. 17815168.4.

* cited by examiner

FUEL CELL

TECHNICAL FIELD

The technical field relates to a separator constituting a fuel cell. Particularly, the technical field relates to a fuel cell in which a sheet material containing a fiber sheet and resin is formed between a pair of separator plates.

BACKGROUND

A fuel cell causes an electrochemical reaction of a hydrogen-containing fuel gas with an oxygen-containing oxidant gas such as air. The electrochemical reaction of a fuel cell produces power and heat, at the same time. FIG. 9 is an exploded perspective view showing a basic configuration of a single cell of a traditional polymer electrolyte fuel cell. The traditional polymer electrolyte fuel cell is basically configured from a polymer electrolyte membrane 1 that selectively transports hydrogen ions, and a pair of electrodes—an anode 7 and a cathode 6—formed on both sides of the polymer electrolyte membrane 1.

The main component of the electrodes is a carbon powder supporting a platinum-group metal catalyst, and the electrodes include a fuel-side catalyst layer 3 and an oxidant-side catalyst layer 2 formed on surfaces of the polymer electrolyte membrane 1, and an oxidant-side gas diffusion layer 4 and a fuel-side gas diffusion layer 5, which are air-permeable, electrically conductive layers formed on the outer surfaces of the oxidant-side catalyst layer 2 and the fuel-side catalyst layer 3, respectively.

The assembly of the polymer electrolyte membrane 1, the oxidant-side catalyst layer 2 and the fuel-side catalyst layer 3 is called a catalyst-coated membrane (hereinafter, referred to as "CCM"). Around the anode 7 and the cathode 6 on both sides of the polymer electrolyte membrane 1 are disposed sealing members 11 to prevent leaking of supplied gas from the oxidant-side catalyst layer 2 and the fuel-side catalyst layer 3 to outside, and mixing of the fuel gas and the oxidant gas. The CCM sealed with the sealing members 11 at the peripheries, or an assembly of the fuel-side gas diffusion layer 5 and the oxidant-side gas diffusion layer 4 attached to the CCM is called an electrolyte membrane electrode assembly (hereinafter, referred to as "MEA").

On both sides of the MEA 12 are disposed electrically conductive separators 10, which mechanically fix the MEA 12 from both sides, and electrically connect adjacent MEAs 12 in series. The separators 10 may be provided with fuel-side channel grooves 8 and oxidant-side channel grooves 9 in portions contacting the MEA 12 so that the separators 10 can serve to supply a fuel gas to the anode 7, and a reactive gas, such as an oxidant gas, to the cathode 6, and to release generated water or excess gas.

The MEA 12 is the smallest unit with electricity generating capability, and constitutes a single-battery module with the pair of separators 10 provided on both sides. Suited as the separator 10 is a material having desirable corrosion resistance, for example, such as stainless steel. From the viewpoint of providing mechanical strength and lightness to a fuel cell for vehicles, JP-A-2005-339954 proposes using a fiber sheet-resin composite prepreg as separator material.

The prepreg disclosed in this related art is obtained by impregnating a fiber sheet with resin, and forms a member having excellent impact resistance that can be produced with high productivity. It is, however, difficult to completely impregnate resin between the constituent fibers of the fiber sheet, and microvoids tend to occur between fibers. Accordingly, when used to form a member requiring high gas sealability, the prepreg may cause leakage of hydrogen and air from the fuel cell through such voids.

SUMMARY

The present disclosure is intended to provide a solution to the problem of the related art, and it is an object of the present disclosure to provide a polymer electrolyte fuel cell that can reduce leakage of gas to outside when a fiber sheet-resin composite material is used as a fuel-cell sealing member.

According to an aspect of the disclosure, a fuel cell includes: an electrolyte membrane; a cathode positioned on a first surface of the electrolyte membrane; an anode positioned on a second surface of the electrolyte membrane; a cathode-side sealant positioned on a surface of the cathode different from the electrolyte membrane side of the cathode; an anode-side sealant positioned on a surface of the anode different from the electrolyte membrane side of the anode; a cathode-side separator positioned on a surface of the cathode-side sealant different from the cathode side of the cathode-side sealant; and an anode-side separator positioned on a surface of the anode-side sealant different from the anode side of the anode-side sealant, the anode-side separator having a projection on a surface stacked on the anode-side sealant, or the cathode-side separator having a projection on a surface stacked on the cathode-side sealant.

The present disclosure concerns a fuel cell having projections that contact fiber sheets. The projections press the fiber sheets, and reduce the microvoids between fibers to reduce leakage to outside.

DESCRIPTION OF EMBODIMENTS

Figure 9:
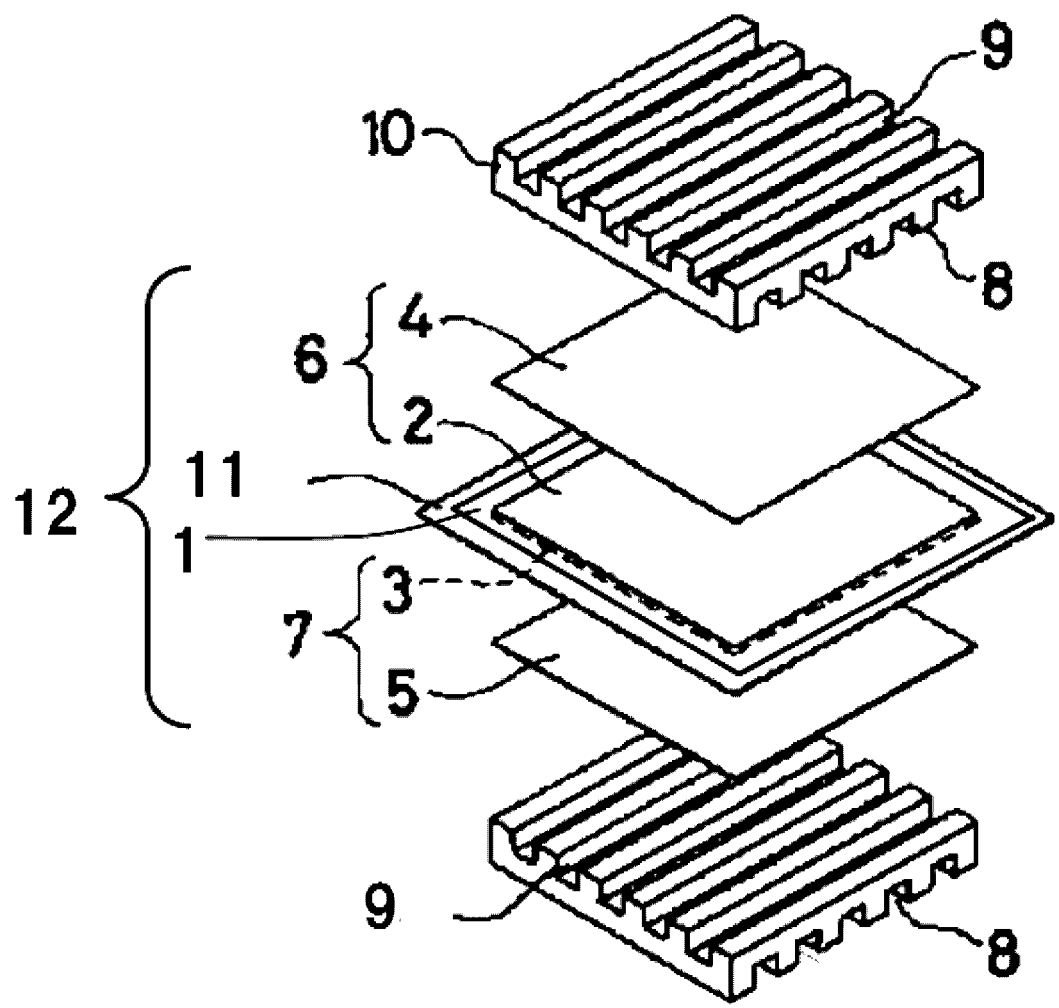
FIG. 9 is an exploded perspective view representing a basic configuration of a traditional fuel cell.

Embodiments of the present disclosure are described below, with reference to the accompanying drawings. A description of elements having the same reference numerals used in FIG. 9 is omitted.

First Embodiment

Figure 1:
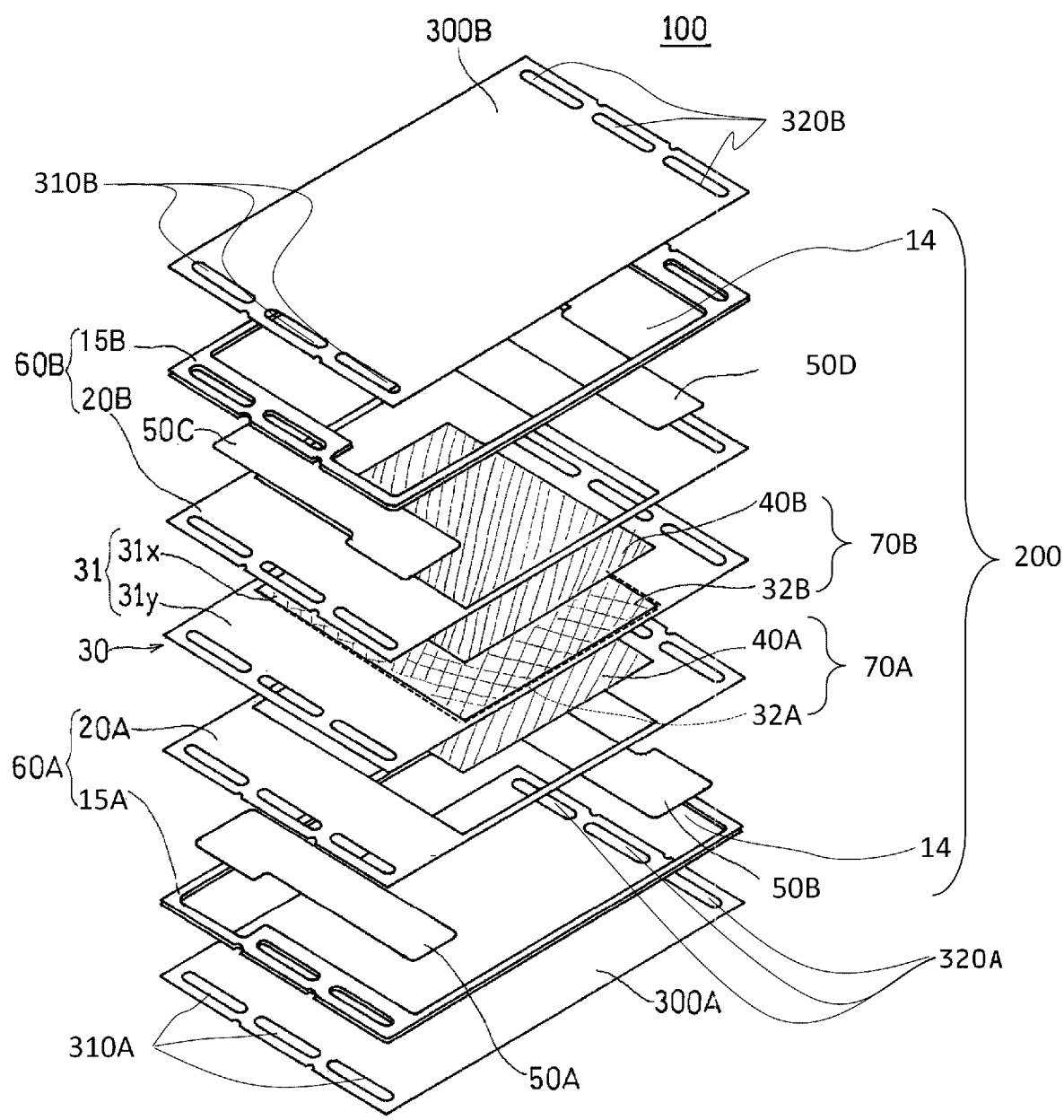
FIG. 1 is an exploded perspective view of a fuel cell of a First Embodiment.

FIG. 1 is a partially exploded perspective view schematically representing the structure of a fuel cell 100 as an example of a fuel cell according to a First Embodiment of the present disclosure. As illustrated in FIG. 1, the fuel cell 100 includes a pair of separators 300A and 300B sandwiching a single-battery module 200 (cell).

Single-Battery Module 200

The single-battery module 200 is where a fuel gas and an oxidant gas undergo electrochemical reactions to generate power and heat at the same time. The single-battery module 200 includes a CCM 30 disposed in the middle, and a fuel-side gas diffusion layer 40A and an oxidant-side gas diffusion layer 40B disposed on both sides of the CCM 30 by covering a fuel-side catalyst layer 32A (hidden in the figure) and an oxidant-side catalyst layer 32B, respectively.

The fuel-side gas diffusion layer 40A and the oxidant-side gas diffusion layer 40B are provided to supply a reactive gas, such as a fuel gas and an oxidant gas, to the electrodes, and to release generated water, and excess gas.

The CCM 30 includes an electrolyte membrane 31 having a central region 31X, and a periphery portion 31Y surrounding the central region 31X. The CCM 30 also includes the fuel-side catalyst layer 32A attached to the surface on the lower side of the central region 31X, and the oxidant-side catalyst layer 32B attached to the surface on the upper side of the central region 31X.

The fuel-side catalyst layer 32A functions as an anode (fuel electrode). The oxidant-side catalyst layer 32B functions as a cathode (oxidant electrode).

In response to a fuel gas supplied to the fuel-side catalyst layer 32A of the CCM 30, and an oxidant gas supplied to the oxidant-side catalyst layer 32B, an anode reaction (formula 1) takes place on the anode side, decomposing hydrogen molecules into hydrogen ions and electrons. On the cathode side, a cathode reaction (formula 2) takes place that generates water from oxygen, hydrogen ions, and electrons. In the end, electricity is generated by the reaction of formula 3.

$$H_2 \rightarrow 2H^+ + 2e^-$$ 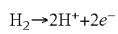 Formula 1

$$2H^+ + (1/2)O_2 \rightarrow H_2O$$ 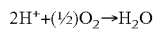 Formula 2

$$H_2 + (1/2)H_2O$$ 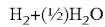 Formula 3

In the example of FIG. 1, sealing members 60A and 60B, which are provided as a pair, are each configured from two layer parts. Specifically, the sealing member 60A includes an outer sealing member 15A and an inner sealing member 20A, and the sealing member 60B includes an outer sealing member 15B and an inner sealing member 20B. When the sealing members 60A and 60B are configured from two or more parts as in this example, it is not required to form all parts using a material containing a fiber sheet and a resin impregnated in the fiber sheet.

In the sealing member 60A, the outer sealing member 15A is in contact with or attached to the separator 300A. The inner sealing member 20A is disposed opposite the separator 300A via bridge plates 50A and 50B provided as spacers, and is in contact with or attached to the periphery portion 31Y of the electrolyte membrane 31.

Likewise, in the sealing member 60B, the outer sealing member 15B is in contact with or attached to the separator 300B, and the inner sealing member 20B is disposed opposite the separator 300B via bridge plates 50C and 50D, and is in contact with or attached to the periphery portion 31Y of the electrolyte membrane 31.

It is desirable that the inner sealing members 20A and 20B cover as large a surface of the periphery portion 31Y of the electrolyte membrane 31 as possible so as to prevent a cross leak of the fuel gas or the oxidant gas through the electrolyte membrane 31.

On the inner side of the outer sealing members 15A and 15B are provided loops 14, which are spaces for accommodating the pair of bridge plates 50A and 50B, and the pair of bridge plates 50C and 50D.

The bridge plates 50A to 50D are disposed in pairs so that an anode 70A configured from the fuel-side gas diffusion layer 40A and the fuel-side catalyst layer 32A, and a cathode 70B configured from the oxidant-side gas diffusion layer 40B and the oxidant-side catalyst layer 32B lie between the end portions where manifolds 310A and 320A, and manifolds 310B and 320B are disposed. The bridge plates 50A, 50B, 50C, and 50D have surface irregularities so that supplied gas through the predetermined manifolds 310A, 320A, 310B, and 320B can reach the fuel-side catalyst layer 32A and the oxidant-side catalyst layer 32B through the gaps created between the bridge plates 50A, 50B, 50C, and 50D and the separators 300A and 300B.

The catalyst metal of the fuel-side catalyst layer 32A constituting the anode 70A may be, for example, a Pt—Ru alloy. The catalyst metal of the oxidant-side catalyst layer 32B constituting the cathode 70B may be, for example, Pt, or a Pt—Co alloy. The catalyst metal may be supported on a conductive powder. The conductive powder may be, for example, carbon black.

The fuel-side gas diffusion layer 40A and the oxidant-side gas diffusion layer 40B may be formed using conductive porous substrates. Preferably, the conductive porous substrates are formed of carbon materials, for example, such as carbon black, graphite, and a carbon fiber. The fuel-side gas diffusion layer 40A and the oxidant-side gas diffusion layer 40B may have grooves or ribs that form gas channels. The channels are not particularly limited to particular shapes, and may be, for example, parallel channels, or serpentine channels.

In a preferred embodiment, the electrolyte membrane 31 is a polymer electrolyte sheet having hydrogen ion conductivity. Preferably, the polymer electrolyte is one having excellent heat resistance and excellent chemical stability. Examples of the polymer electrolyte include perfluorocarbonsulfonic acid polymers. Examples of the per fluorocarbonsulfonic acid polymers include Nafion®. These materials also may be used as the polymer electrolyte contained in the anode and the cathode.

Separators 300A and 300B

The separators 300A and 300B mechanically fix the single-battery module 200 from both sides. The separators 300A and 300B also electrically connect adjacent single-battery modules 200 in series. The separators 300A and 300B also function as a pathway for releasing generated water and excess gas, in addition to supplying gas to the anode 70A and the cathode 70B.

The material of the separators 300A and 300B are is particularly limited, as long as it has airtightness, electron conductivity, and electrochemical stability. The separators 300A and 300B may have gas channels on the inner surfaces (the surfaces facing the fuel-side gas diffusion layer 40A and the oxidant-side gas diffusion layer 40B).

Figure 2:
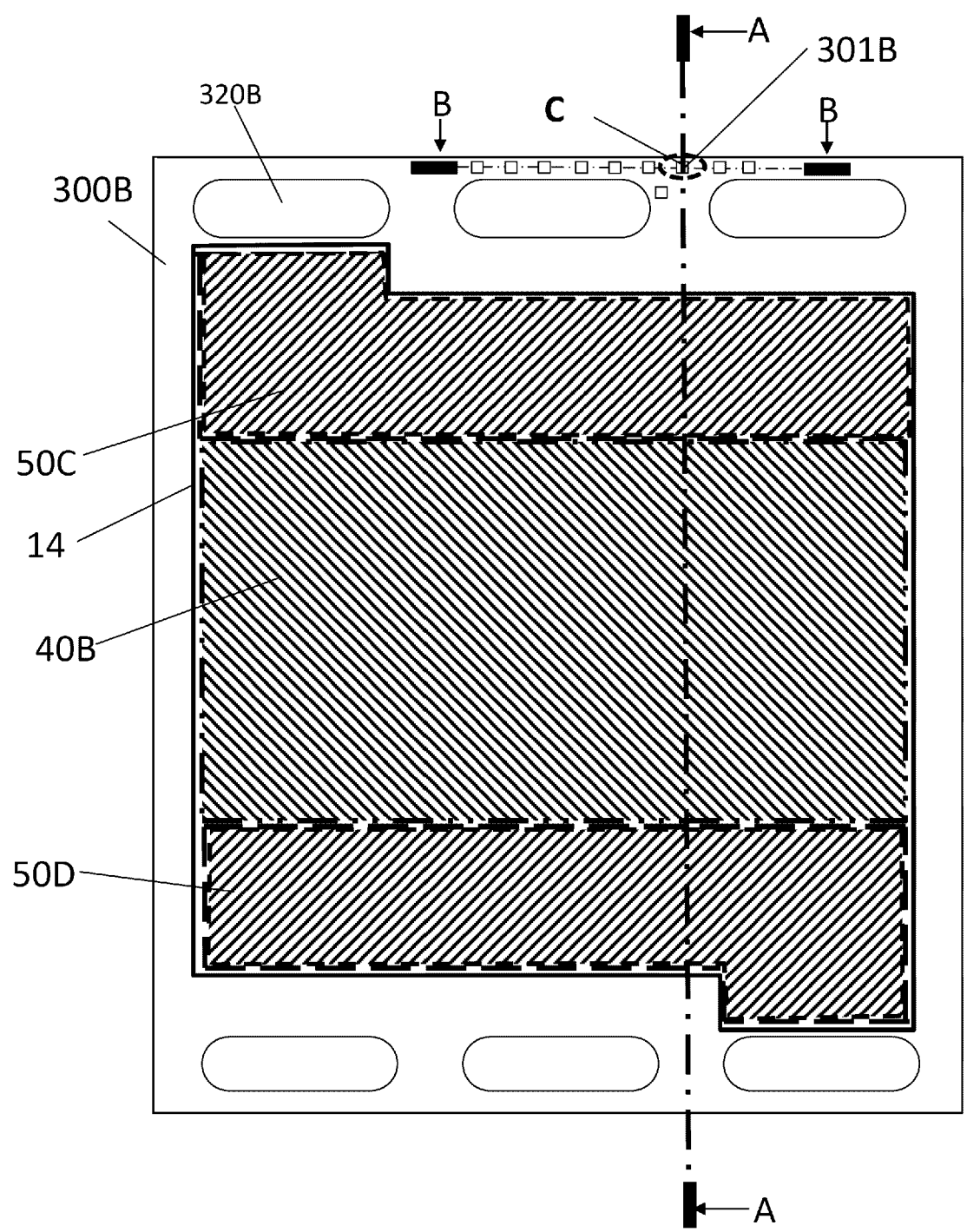
FIG. 2 is a schematic diagram representing a planar arrangement of a separator, a bridge plate, and a gas diffusion layer as viewed from the separator side of the fuel cell of the First Embodiment, and a layout of projections of the separator as viewed from the gas diffusion layer side.

FIGS. 2, 3, 4, and 5 are explanatory diagrams representing the fuel cell 100 of the First Embodiment of the present disclosure. Specifically, FIG. 2 is a plan view of the fuel cell 100 as viewed from the separator 300B side. The bridge plates 50C and 50D reside in areas indicated by broken lines, whereas the oxidant-side gas diffusion layer 40B resides in an area indicated by two-dot chain lines.

Ellipsoid C in FIG. 2 indicates a projection 301B provided for the separator 300B, as viewed from the oxidant-side gas diffusion layer 40B side of the separator 300B. The number of projections 301B is not limited to the example shown in the figure.

Preferably, the projections 301 are positioned on the inner side of the manifold 310B to provide airtightness between the manifold 310B and other portions.

Preferably, the projections 301 are provided throughout the region where the outer sealing member 15B and the separator 300B are attached to each other. Preferably, the projections 301 are present in the whole perimeter of the rectangular shape of the separator 300B.

Preferably, the height of the projections 301 is about 1/10 to about 1/3 of the thickness of the outer sealing member 15B.

Preferably, the projections 301 are columnar in shape with a flat end to press fibers. Examples of the preferred shapes of the projections 301 include a cube, a cuboid, a truncated cylinder, a truncated quadrangular prism, a truncated cone, and a truncated pyramid.

Figure 3:
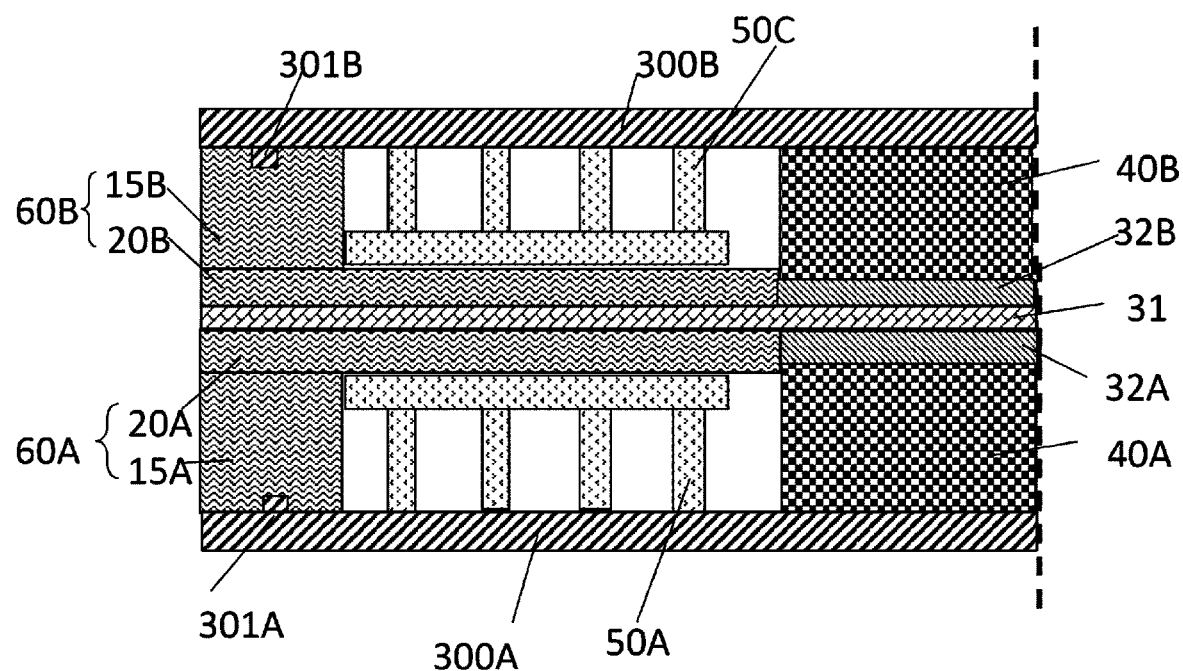
FIG. 3 is a partial cross sectional view at line A-A of FIG. 2.

FIG. 3 is a cross sectional view at A-A of FIG. 2. The projections 301B are disposed in regions of the separator 300B where the separator 300B is attached to the outer sealing member 15B. Similarly, the projections 301A are disposed in regions of the separator 300A where the separator 300A contacts the outer sealing member 15A. In FIG. 3, the layout of the projections 301B and the projections 301A is not limited to that shown in the figure.

Figure 4:
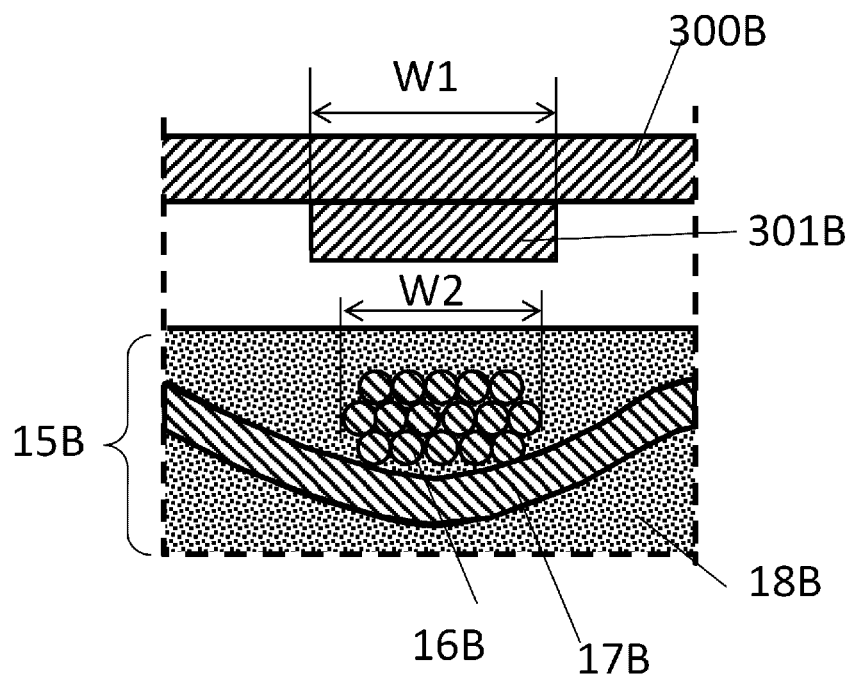
FIG. 4 is a partial cross sectional view at line B-B of FIG. 2.
Figure 5:
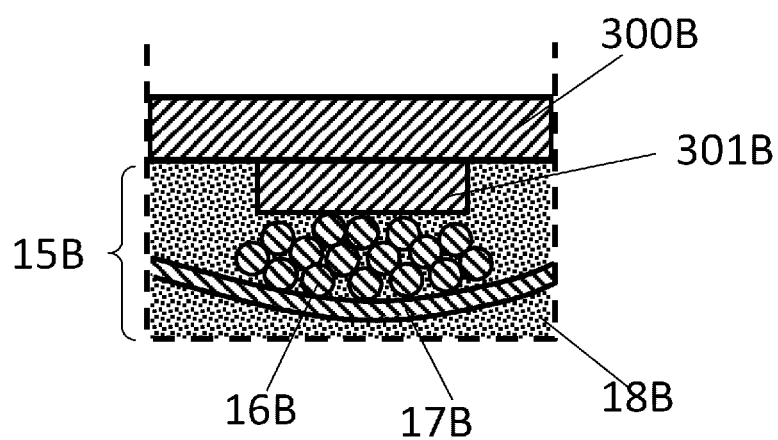
FIG. 5 is a partial cross sectional view of the fuel cell of the First Embodiment (a cross sectional view at line B-B of FIG. 2).

FIGS. 4 and 5 are partial cross sectional views at line B-B of FIG. 2. FIG. 4 shows a state before the separator 300B and the outer sealing member 15B are attached to each other. FIG. 5 shows a state after the separator 300B and the outer sealing member 15B are attached to each other.

In FIG. 4, the outer sealing member 15B is configured from a fiber bundle 16B extending in a first direction from the inner side to the outer side of the fuel cell 100, a fiber bundle 17B extending in a second direction perpendicular to the first direction, and a resin 18B impregnating the fiber bundle 16B and the fiber bundle 17B. The crossing angle is preferably, but not limited to, perpendicular.

The width W1 of the projections 301B is preferably equal to or greater than the width W2 of the plurality of fiber bundles 16B in the first direction.

With this configuration, it is ensured that the projections 301B press the fiber bundles 16B as illustrated in FIG. 5 when the single-battery module 200 is heated and pressed between the separators 300A and 300B in the process of assembling the fuel cell 100. This crushes and reduces the microvoids between the fibers, making it possible to reduce leaking of apart of the supplied fuel gas or oxidant gas from inside of the fuel cell 100 to outside.

Second Embodiment

Figure 6:
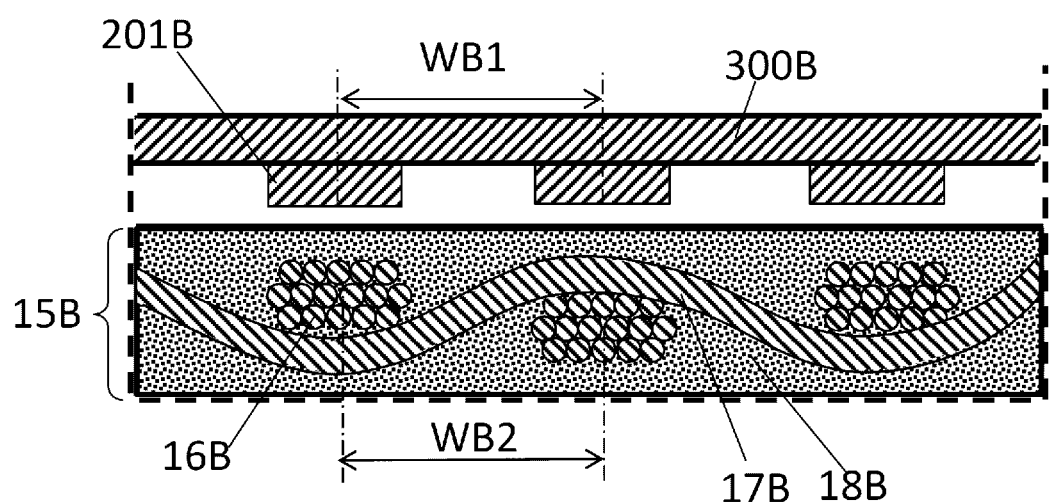
FIG. 6 is a partial schematic view of a separator and an outer sealing member of a fuel cell of a Second Embodiment before attachment.

A fuel cell 100a of a Second Embodiment is described below, with reference to FIG. 6. FIG. 6 is a cross sectional view of the fuel cell 100a taken at the same position as in FIG. 4, showing a wider area than FIG. 4. FIG. 6 is a cross sectional view showing a layout of projections 201B provided for the separator 300B of the fuel cell 100a of the Second Embodiment, and the fiber bundles 16B of the outer sealing member 15B. Anything that is not described is the same as in the First Embodiment. In FIG. 6, the same constituting elements described in FIG. 4 have the same reference numerals, and will not be described.

The pitch WB1 of the adjacent projections 201B is the same as the pitch WB2 between the fiber bundles 16B. Preferably, the projections 201B correspond in position to the fiber bundles 16B. This ensures that the microvoids between the fibers are more reliably reduced.

The overlapping length of the projection 201B and the fiber bundle 16B is not particularly limited. It is, however, preferable that the projection 201B overlap at least 50% of the width W2 of the fiber bundle 16B.

Third Embodiment

Figure 7:
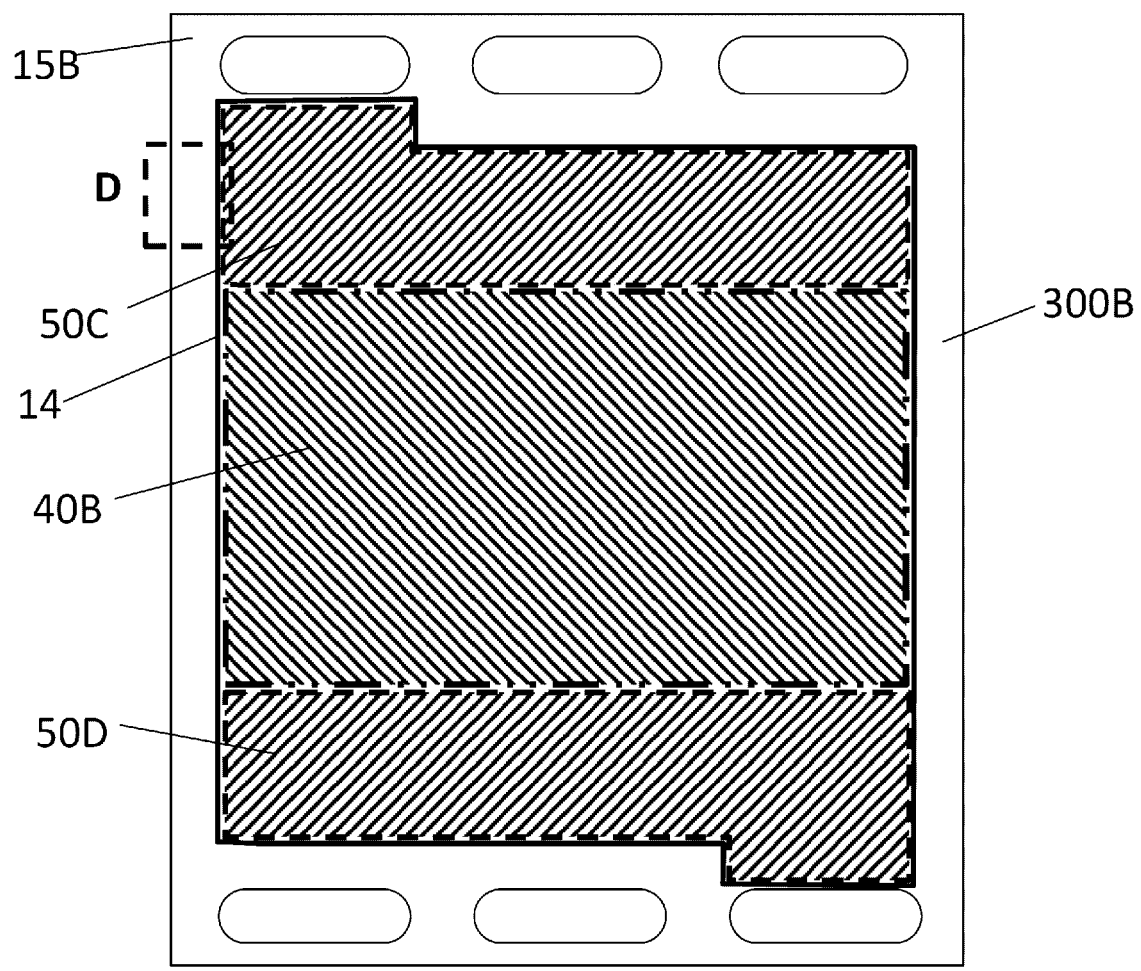
FIG. 7 is a schematic view representing an arrangement of a separator, a bridge plate, a gas diffusion layer, and an outer sealing member as viewed from the separator side of a fuel cell of a Third Embodiment.

A fuel cell 100c of a Third Embodiment is described below, with reference to FIGS. 7 and 8. FIG. 7 is a plan view showing a layout of the outer sealing member 15B as viewed from the separator 300B side of the fuel cell of the Third Embodiment.

Figure 8:
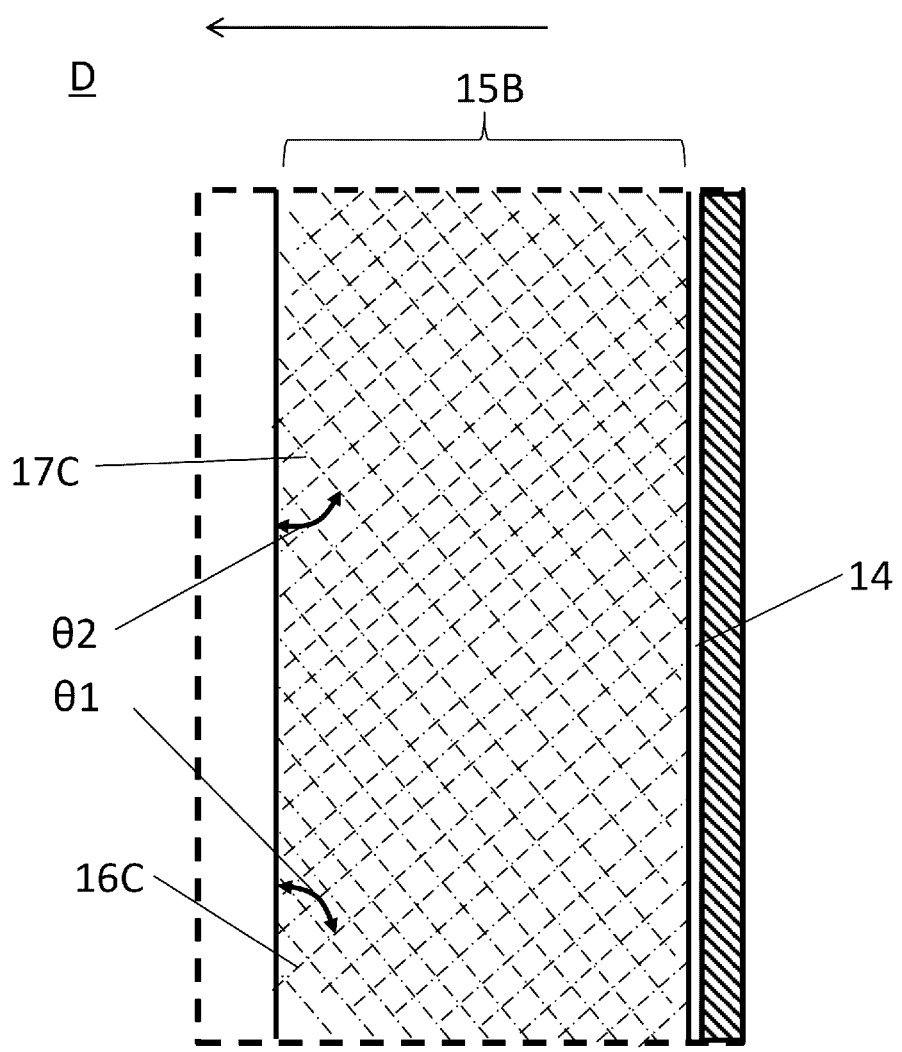
FIG. 8 is a partial schematic view of the outer sealing member of the Third Embodiment.

FIG. 8 is a partial plan view of the outer sealing member 15B in region D of FIG. 7, partially showing the fiber bundles 16C and 17C of the outer sealing member 15B in two-dot chain lines. The fiber bundles 16C of the outer sealing member 15B are aligned in an angle $\theta 1$ of 45° with respect to the direction from the inner side to the outer side of the loop 14 (opening) of the outer sealing member 15B (the direction of arrow in FIG. 8). The fiber bundles 17C of the outer sealing member 15B are aligned in a direction perpendicular to the direction of the fiber bundles 16B. That is, the angle $\theta 2$ is also 45°. The angles $\theta 1$ and $\theta 2$ are preferably 30° to 60°. The angles $\theta 1$ and $\theta 2$ can be said as angles with respect to the outer side of the fuel cell. The aligned directions of the fibers shown in FIG. 8 are different from the directions of the fibers shown in FIG. 6, and these represent different embodiments.

Because of the long distance from the inner side to the outer side of the loop 14, it is possible with the foregoing configuration to more reliably reduce leakage even when microvoids are present between the fibers. Here, the distance is the distance along the fibers.

FINAL NOTE

The embodiments described above may be combined.

The foregoing embodiments are applicable to at least one of the cathode side and the anode side, and are applied to preferably both the cathode side and the anode side.

That is, the foregoing embodiments based on the outer sealing member 15B are merely an example, and the disclosure is also applicable to the outer sealing member 15A. The disclosure is also applicable to when, for example, the inner sealing members 20A and 20B are sealing members having fiber sheets.

A fuel cell of the present disclosure can be used as a power supply for home cogeneration systems, a portable power source, or a power supply for vehicles.

What is claimed is:

1. A fuel cell comprising:
an electrolyte membrane;
a cathode positioned on a first surface of the electrolyte membrane;
an anode positioned on a second surface of the electrolyte membrane;
a cathode-side sealant positioned on a surface of the cathode different from an electrolyte membrane side of the cathode;
an anode-side sealant positioned on a surface of the anode different from an electrolyte membrane side of the anode;

a cathode-side separator positioned on a surface of the cathode-side sealant different from a cathode side of the cathode-side sealant; and an anode-side separator positioned on a surface of the anode-side sealant different from an anode side of the anode-side sealant, the anode-side separator having a projection on a surface of the anode-side separator stacked on the anode-side sealant, or the cathode-side separator having a projection on a surface of the cathode-side separator stacked on the cathode-side sealant, wherein the cathode-side sealant or the anode-side sealant contains a first fiber bundle in which a plurality of parallel fibers are assembled into one bundle, a second fiber bundle in which a plurality of parallel fibers are assembled into one bundle, and a resin, wherein the parallel fibers of the first fiber bundle extend in a first direction, the parallel fibers of the second fiber bundle extend in a second direction different from the first direction, and wherein all of the parallel fibers of the first fiber bundle are pressed by the projection such that a width of the first fiber bundle is wider than a width of the projection.

2. The fuel cell according to claim 1, wherein the projection on the surface of the anode-side separator or the cathode-side separator is one of a plurality of projections arranged in parallel to each other, wherein the first fiber bundle is one of a plurality of first fiber bundles arranged in parallel, each of the first fiber bundles having a plurality of parallel fibers extending in the first direction, wherein the second fiber bundle is one of a plurality of second fiber bundles arranged in parallel, each of the second fiber bundles having a plurality of parallel fibers extending in the second direction, and wherein the plurality of projections are arranged at a pitch equal to a pitch at which the plurality of first fiber bundles are arranged, or to a pitch at which the plurality of second fiber bundles are arranged.

3. The fuel cell according to claim 1, wherein the first direction and the second direction are perpendicular to each other.

4. The fuel cell according to claim 1, wherein the first direction or the second direction creates an angle of 30 to 60 degrees with respect to an outer side of the fuel cell.

5. The fuel cell according to claim 1, wherein in the first fiber bundle, a width of the plurality of fibers is greater than a thickness of the plurality of fibers.

* * * * *